United States Patent
Al-Banna et al.

(10) Patent No.: US 12,407,619 B2
(45) Date of Patent: Sep. 2, 2025

(54) TUNABLE LATENCY WITH MINIMUM JITTER

(71) Applicant: ARRIS Enterprises LLC, Suwanee, GA (US)

(72) Inventors: Ayham Al-Banna, Irving, TX (US); James R. Flesch, Doraville, GA (US); Charles Cheevers, Alpharetta, GA (US); James M. Moss, Suwanee, GA (US); Thomas J. Cloonan, Lisle, IL (US); David Franklin Baran, Haverford, PA (US)

(73) Assignee: ARRIS Enterprises LLC, Suwanee, GA (US)

( * ) Notice: Subject to any disclaimer, the term of this patent is extended or adjusted under 35 U.S.C. 154(b) by 154 days.

(21) Appl. No.: 18/107,818

(22) Filed: Feb. 9, 2023

(65) Prior Publication Data

US 2023/0275843 A1 Aug. 31, 2023

Related U.S. Application Data

(60) Provisional application No. 63/314,877, filed on Feb. 28, 2022.

(51) Int. Cl.
| | | |
|---|---|---|
| *H04L 12/24* | (2006.01) | |
| *H04L 12/26* | (2006.01) | |
| *H04L 12/28* | (2006.01) | |
| *H04L 29/06* | (2006.01) | |
| *H04L 29/08* | (2006.01) | |
| *H04L 47/283* | (2022.01) | |
| *H04L 49/9023* | (2022.01) | |

(52) U.S. Cl.
CPC ........ *H04L 47/283* (2013.01); *H04L 12/2801* (2013.01); *H04L 49/9023* (2022.05)

(58) Field of Classification Search
CPC ............... H04L 47/283; H04L 49/9023; H04L 12/2801; H04L 47/28; H04L 12/24; H04L 12/26; H04L 29/08; H04L 29/06
USPC ......................................................... 709/238
See application file for complete search history.

(56) References Cited

U.S. PATENT DOCUMENTS

| | | | |
|---|---|---|---|
| 2010/0049942 A1* | 2/2010 | Kim ..................... | G06F 13/4027 712/30 |
| 2012/0144065 A1* | 6/2012 | Parker ............... | G06F 15/17312 709/241 |
| 2016/0296840 A1* | 10/2016 | Kaewell ............. | H04L 41/5025 |
| 2020/0125716 A1* | 4/2020 | Chittamuru ............ | H04W 4/06 |

(Continued)

FOREIGN PATENT DOCUMENTS

EP 3280105 A1 2/2018

OTHER PUBLICATIONS

International Search Report and Written Opinion Re: Application No. PCT/US23/12721, dated Apr. 25, 2023.

*Primary Examiner* — Jude Jean Gilles
(74) *Attorney, Agent, or Firm* — Chernoff, Vilhauer, McClung & Stenzel, LLP

(57) ABSTRACT

Systems and methods for relaying a plurality of data packets to and from a subscriber over an access network that imparts a variable latency of one packet relative to other packets. The latency of each packet is controlled so as to increase the average latency experienced by the plurality of packets and decrease the variance of the respective latencies experienced by each of the packets.

15 Claims, 12 Drawing Sheets

(56) References Cited

U.S. PATENT DOCUMENTS

2020/0341791 A1    10/2020  Tsirkin
2021/0258184 A1*  8/2021  Butehorn ............ H04L 12/2865

* cited by examiner

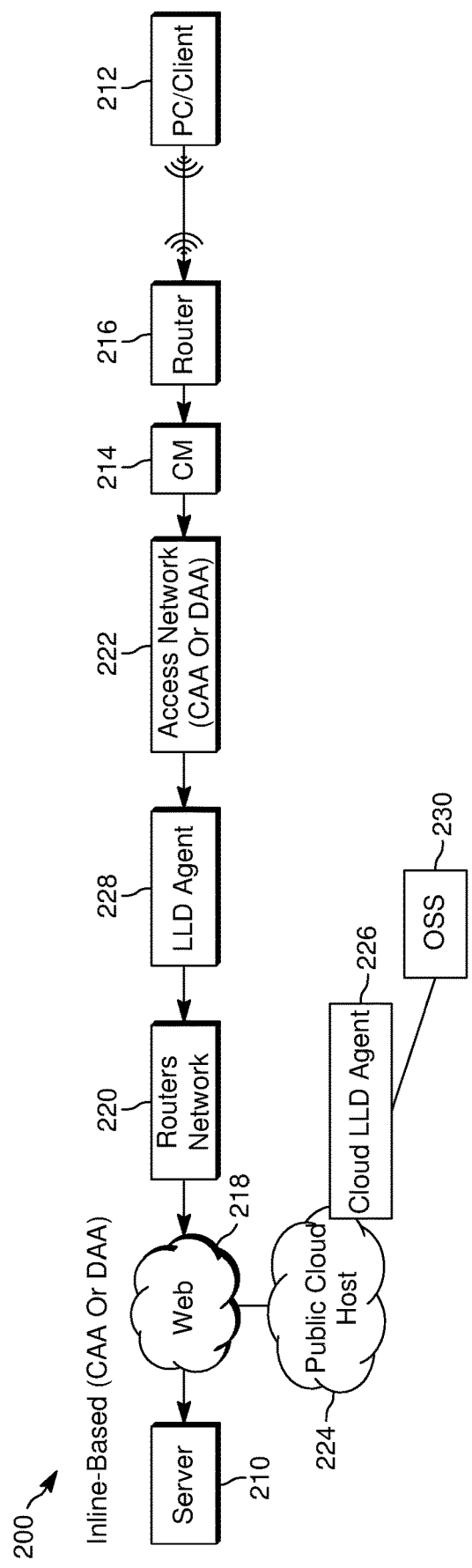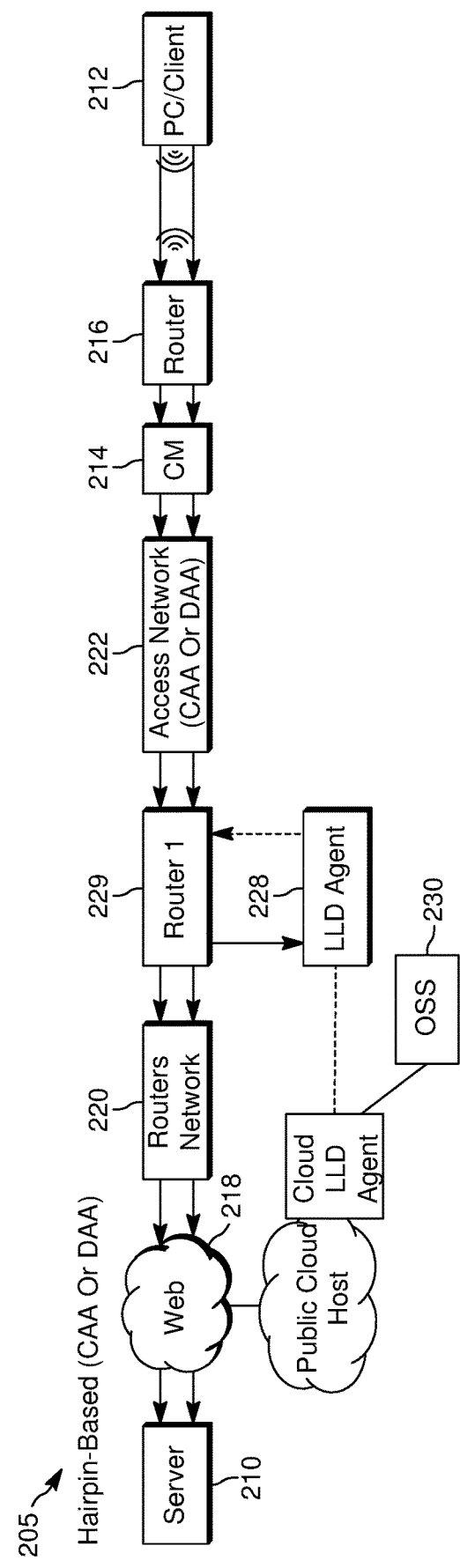

TUNABLE LATENCY WITH MINIMUM JITTER

CROSS REFERENCE TO RELATED APPLICATIONS

This application claims the benefit of U.S. Provisional Patent Application Ser. No. 63/314,877 filed Feb. 28, 2022.

BACKGROUND

The subject matter of this application generally relates to implementing low-latency traffic in a Data over Cable Service Interface Specification (DOCSIS) environment.

Cable Television (CATV) services have historically provided content to large groups of subscribers from a central delivery unit, called a "head end," which distributes channels of content to its subscribers from this central unit through a branch network comprising a multitude of intermediate nodes. Historically, the head end would receive a plurality of independent programming content, multiplex that content together while simultaneously modulating it according to a Quadrature Amplitude Modulation (QAM) scheme that maps the content to individual frequencies or "channels" to which a receiver may tune so as to demodulate and display desired content.

Modern CATV service networks, however, not only provide media content such as television channels and music channels to a customer, but also provide a host of digital communication services such as Internet Service, Video-on-Demand, telephone service such as VoIP, and so forth. These digital communication services, in turn, require not only communication in a downstream direction from the head end, through the intermediate nodes and to a subscriber, but also require communication in an upstream direction from a subscriber, and to the content provider through the branch network.

To this end, these CATV head ends include a separate Cable Modem Termination System (CMTS), used to provide high speed data services, such as video, cable Internet, Voice over Internet Protocol, etc. to cable subscribers. Typically, a CMTS will include both Ethernet interfaces (or other more traditional high-speed data interfaces) as well as RF interfaces so that traffic coming from the Internet can be routed (or bridged) through the Ethernet interface, through the CMTS, and then onto the optical RF interfaces that are connected to the cable company's hybrid fiber coax (HFC) system. Downstream traffic is delivered from the CMTS to a cable modem in a subscriber's home, while upstream traffic is delivered from a cable modem in a subscriber's home back to the CMTS. Many modern CATV systems have combined the functionality of the CMTS with the video delivery system (EdgeQAM) in a single platform called the Converged Cable Access Platform (CCAP). The foregoing architectures are typically referred to as centralized access architectures (CAA) because all of the physical and control layer processing is done at a central location, e.g., a head end.

Recently, distributed access architectures (DAA) have been implemented that distribute the physical layer processing, and sometimes the MAC layer processing deep into the network. Such system include Remote PHY (or R-PHY) architectures, which relocate the physical layer (PHY) of a traditional CCAP by pushing it to the network's fiber nodes. Thus, while the core in the CCAP performs the higher layer processing, the R-PHY device in the node converts the downstream data sent by the core from digital-to-analog to be transmitted on radio frequency as a QAM signal and converts the upstream RF data sent by cable modems from analog-to-digital format to be transmitted optically to the core. Other modern systems push other elements and functions traditionally located in a head end into the network, such as MAC layer functionality (R-MACPHY), etc.

Evolution of CATV architectures, along with the DOCSIS standard, have typically been driven by increasing consumer demand for bandwidth, and more particularly growing demand for Internet and other data services. However, bandwidth is not the only consideration, as many applications such as video teleconferencing, gaming, etc. also require low latency. Thus, the DOCSIS 3.1 specifications incorporated the Low Latency DOCSIS (LLD) feature to enable lower latency and jitter values for latency-sensitive applications by creating two separate service flows, where latency-sensitive traffic is carried over its own service flow that is prioritized over traffic that is not latency-sensitive. Although the DOCSIS 3.1 standard allows for bifurcation of traffic into low-latency and non-low-latency traffic, it does not specify how traffic is identified, or how it is placed onto a low latency service flow. While this can be solved by having client devices such as gateways inside the home mark the latency-sensitive traffic, these solutions are hardware-specific and depend on specific gateway implementation. Therefore, these solutions suffer from several deficiencies including (1) they require a CPE gateway with dedicated software as opposed to a mere modem, which not only makes these solutions more difficult to develop and maintain, but MSOs are dissuaded from working with these solutions given the variety of different hardware brands that need to be supported; (2) such solutions work with IPv4 but only have limited support with IPv6; and (3) such solutions may not work with other access technologies beyond DOCSIS—e.g., PON, 5G, Wi-Fi, etc.

Moreover, end-to-end delay is not the only consideration related to latency that is important to consumers. Jitter, for example, which is the variation in latency across a network is at least as important to online gamers as is overall latency. Variations in the latency in different network elements are cumulative, and can therefore cause jitter to become quite large.

BRIEF DESCRIPTION OF THE DRAWINGS

For a better understanding of the invention, and to show how the same may be carried into effect, reference will now be made, by way of example, to the accompanying drawings, in which:

FIGS. 3C and 3D show exemplary upstream service flows in the architectures of FIGS. 3A and 3B, respectively.

DETAILED DESCRIPTION

Figure 1:
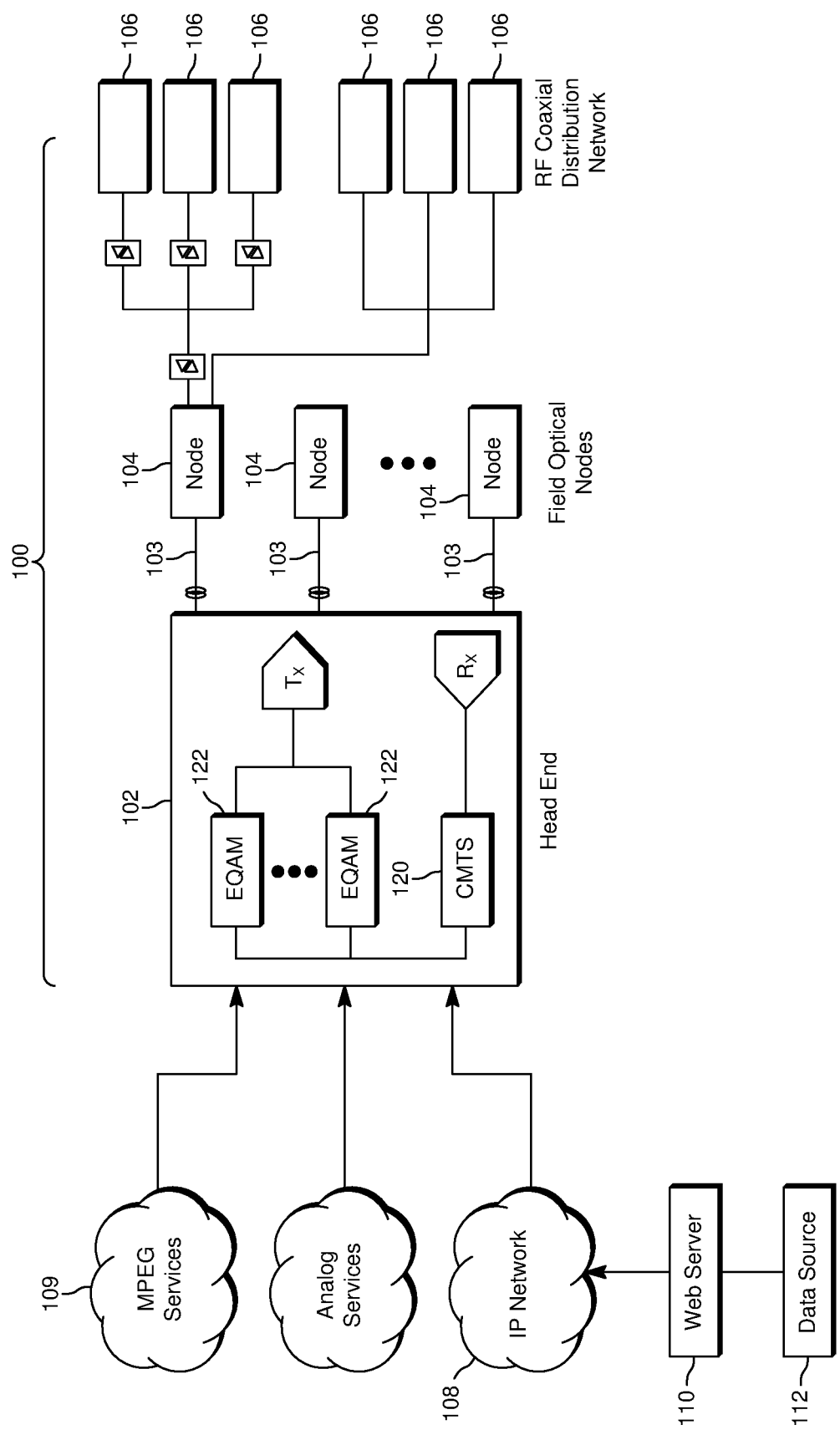
FIG. 1 shows an exemplary centralized access architecture (CAA) that may be used to implement the systems and methods disclosed in the present application.
Figure 2:
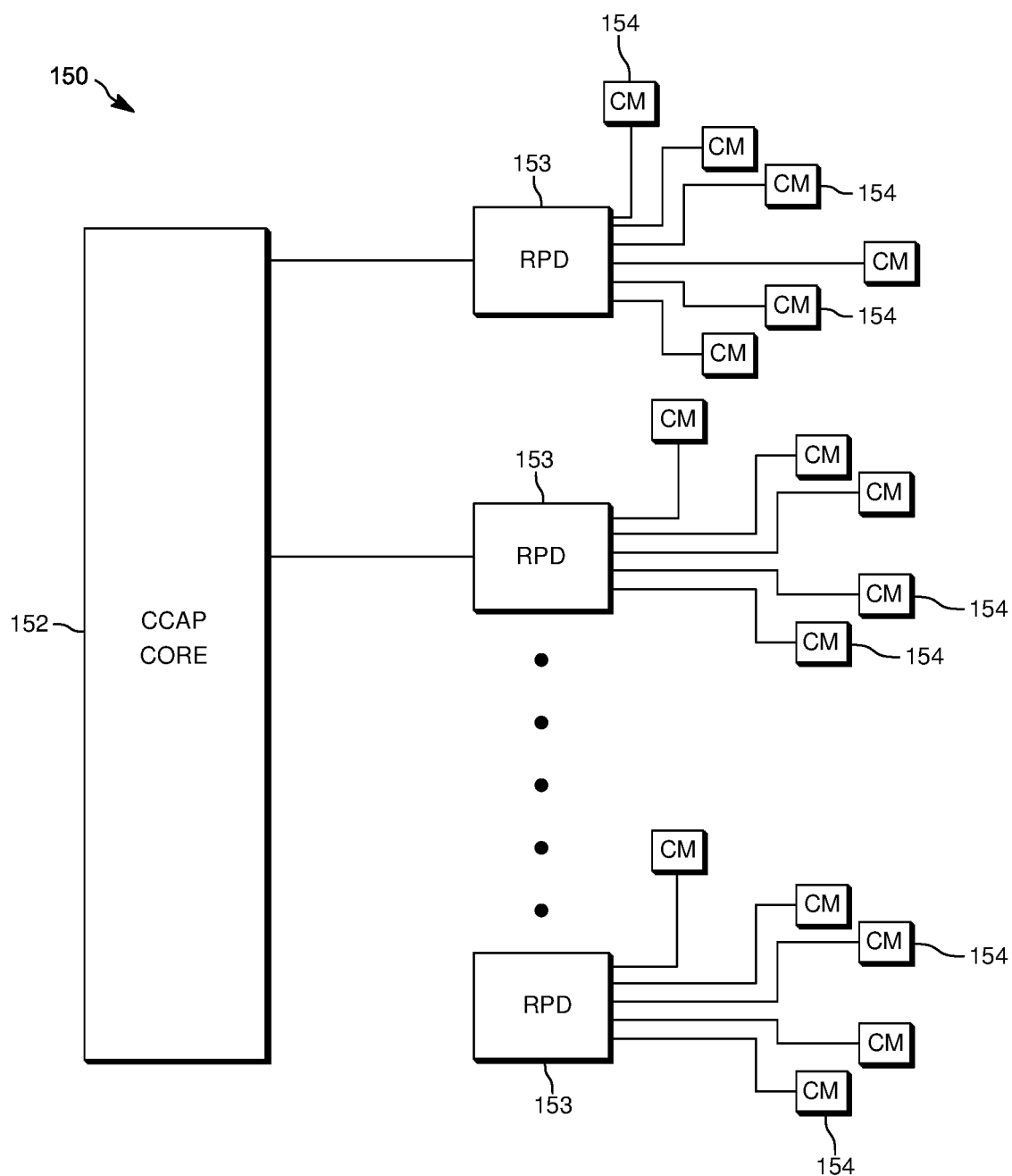
FIG. 2 shows an exemplary distributed access architecture (DAA) that may be used to implement the systems and methods disclosed in the present application

The devices, systems, and methods disclosed in the present application may be implemented with respect to a communications network that provides data services to consumers, regardless of whether the communications network is implemented as a CAA architecture or a DAA architecture, shown respectively in FIGS. 1 and 2.

Referring first to FIG. 1, a Hybrid Fiber Coaxial (HFC) broadband network 100 combines the use of optical fiber and coaxial connections. The network includes a head end 102 that receives analog or digital video signals and digital bit streams representing different services (e.g., video, voice, and Internet) from various digital information sources. For example, the head end 102 may receive content from one or more video on demand (VOD) servers, IPTV broadcast video servers, Internet video sources, or other suitable sources for providing IP content.

An IP network 108 may include a web server 110 and a data source 112. The web server 110 is a streaming server that uses the IP protocol to deliver video-on-demand, audio-on-demand, and pay-per view streams to the IP network 108. The IP data source 112 may be connected to a regional area or backbone network (not shown) that transmits IP content. For example, the regional area network can be or include the Internet or an IP-based network, a computer network, a web-based network or other suitable wired or wireless network or network system.

At the head end 102, the various services are encoded, modulated and up-converted onto RF carriers, combined onto a single electrical signal and inserted into a broadband optical transmitter. A fiber optic network extends from the cable operator's master/regional head end 102 to a plurality of fiber optic nodes 104. The head end 102 may contain an optical transmitter or transceiver to provide optical communications through optical fibers 103. Regional head ends and/or neighborhood hub sites may also exist between the head end and one or more nodes. The fiber optic portion of the example HFC network 100 extends from the head end 102 to the regional head end/hub and/or to a plurality of nodes 104. The optical transmitter converts the electrical signal to a downstream optically modulated signal that is sent to the nodes. In turn, the optical nodes convert inbound signals to RF energy and return RF signals to optical signals along a return path. In the specification, the drawings, and the claims, the terms "forward path" and "downstream" may be interchangeably used to refer to a path from a head end to a node, a node to a subscriber, or a head end to a subscriber. Conversely, the terms "return path", "reverse path" and "upstream" may be interchangeably used to refer to a path from a subscriber to a node, a node to a head end, or a subscriber to a head end.

Each node 104 serves a service group comprising one or more customer locations. By way of example, a single node 104 may be connected to thousands of cable modems or other subscriber devices 106. In an example, a fiber node may serve between one and two thousand or more customer locations. In an HFC network, the fiber optic node 104 may be connected to a plurality of subscriber devices 106 via coaxial cable cascade 111, though those of ordinary skill in the art will appreciate that the coaxial cascade may comprise a combination of fiber optic cable and coaxial cable. In some implementations, each node 104 may include a broadband optical receiver to convert the downstream optically modulated signal received from the head end or a hub to an electrical signal provided to the subscribers' devices 106 through the coaxial cascade 111. Signals may pass from the node 104 to the subscriber devices 106 via the RF cascade 111, which may be comprised of multiple amplifiers and active or passive devices including cabling, taps, splitters, and in-line equalizers. It should be understood that the amplifiers in the RF cascade 111 may be bidirectional, and may be cascaded such that an amplifier may not only feed an amplifier further along in the cascade but may also feed a large number of subscribers. The tap is the customer's drop interface to the coaxial system. Taps are designed in various values to allow amplitude consistency along the distribution system.

The subscriber devices 106 may reside at a customer location, such as a home of a cable subscriber, and are connected to the cable modem termination system (CMTS) 120 or comparable component located in a head end. A client device 106 may be a modem, e.g., cable modem, MTA (media terminal adaptor), set top box, terminal device, television equipped with set top box, Data Over Cable Service Interface Specification (DOCSIS) terminal device, customer premises equipment (CPE), router, or similar electronic client, end, or terminal devices of subscribers. For example, cable modems and IP set top boxes may support data connection to the Internet and other computer networks via the cable network, and the cable network provides bi-directional communication systems in which data can be sent downstream from the head end to a subscriber and upstream from a subscriber to the head end.

References are made in the present disclosure to a Cable Modem Termination System (CMTS) in the head end 102. In general, the CMTS is a component located at the head end or hub site of the network that exchanges signals between the head end and client devices within the cable network infrastructure. In an example DOCSIS arrangement, for example, the CMTS and the cable modem may be the endpoints of the DOCSIS protocol, with the hybrid fiber coax (HFC) cable plant transmitting information between these endpoints. It will be appreciated that architecture 100 includes one CMTS for illustrative purposes only, as it is in fact customary that multiple CMTSs and their Cable Modems are managed through the management network.

The CMTS 120 hosts downstream and upstream ports and contains numerous receivers, each receiver handling communications between hundreds of end user network elements connected to the broadband network. For example, each CMTS 120 may be connected to several modems of many subscribers, e.g., a single CMTS may be connected to hundreds of modems that vary widely in communication characteristics. In many instances several nodes, such as fiber optic nodes 104, may serve a particular area of a town or city. DOCSIS enables IP packets to pass between devices on either side of the link between the CMTS and the cable modem.

It should be understood that the CMTS is a non-limiting example of a component in the cable network that may be used to exchange signals between the head end and subscriber devices 106 within the cable network infrastructure. For example, other non-limiting examples include a Modular CMTS (M-CMTS™) architecture or a Converged Cable Access Platform (CCAP).

An EdgeQAM (EQAM) 122 or EQAM modulator may be in the head end or hub device for receiving packets of digital content, such as video or data, re-packetizing the digital content into an MPEG transport stream, and digitally modulating the digital transport stream onto a downstream RF carrier using Quadrature Amplitude Modulation (QAM). EdgeQAMs may be used for both digital broadcast, and DOCSIS downstream transmission. In CMTS or M-CMTS implementations, data and video QAMs may be implemented on separately managed and controlled platforms. In CCAP implementations, the CMTS and edge QAM functionality may be combined in one hardware solution, thereby combining data and video delivery.

Referring now to FIG. 2, an exemplary DAA architecture is disclosed, e.g., a R-PHY architecture, although as noted above, other DAA architectures may include R-MACPHY architectures, R-OLT architectures, etc. Specifically, a distributed CATV transmission architecture 150 may include a CCAP 152 at a head end connected to a plurality of cable modems 154 via a branched transmission network that includes a plurality of RPD nodes 153. The RPD nodes 153 perform the physical layer processing by receiving downstream, typically digital content via a plurality of northbound ethernet ports and converting the downstream to QAM modulated signals where necessary, and propagating the content as RF signals on respective southbound ports of a coaxial network to the cable modems. In the upstream direction, the RPD nodes receive upstream data content via the southbound RF coaxial ports, convert the signals to an optical domain, and transmit the optical data upstream to the CCAP 152. The architecture of FIG. 1 is shown as an R-PHY system where the CMTS operates as the CCAP core while Remote Physical Devices (RPDs) are located downstream, but alternate systems may use a traditional CCAP operating fully in an Integrated CMTS in a head end, connected to the cable modems 1544 via a plurality of nodes/amplifiers.

The techniques disclosed herein may be applied to systems compliant with DOCSIS. The cable industry developed the international Data Over Cable System Interface Specification (DOCSIS®) standard or protocol to enable the delivery of IP data packets over cable systems. In general, DOCSIS defines the communications and operations support interface requirements for a data over cable system. For example, DOCIS defines the interface requirements for cable modems involved in high-speed data distribution over cable television system networks. However, it should be understood that the techniques disclosed herein may apply to any system for digital services transmission, such as digital video or Ethernet PON over Coax (EPoc). Examples herein referring to DOCSIS are illustrative and representative of the application of the techniques to a broad range of services carried over coax As noted earlier, although CATV architectures have historically evolved in response to increasing consumer demand for bandwidth, many applications such as video teleconferencing, gaming, etc. also require low latency. Specifically, certain services cannot be further improved simply by adding additional bandwidth. Such services include web meetings and live video, as well as online gaming or medical applications. For these applications, latency—as well as jitter, which can be thought of as variation in latency—are at least equally important as bandwidth.

For instance, in gaming applications that involve multiple players competing and collaborating over a common server, latency has an arguably greater impact on gameplay than bandwidth. In this fast-paced environment, millisecond connection delays are the difference between success and failure. As such, low latency is a well-recognized advantage in online multiplayer games. With lower latency—that is, the time that packets spend reaching gaming server and returning a response to the multiplayer gamer—players can literally see and do things in the game before others can. The same analysis can be applied to finance and day trading.

End-to-end latency has several contributing causes, the most obvious being propagation delay between a sender and a receiver; however, many other causes of latency are at least as significant. For example, a gaming console will itself introduce approximately 50 ms of latency and creating an image on-screen by a computer or console takes between 16 to 33 ms to reach the screen over a typical HDMI connection. However, the most significant source of latency is queuing delay-typically within the access network shown in FIGS. 1 and 2. As most applications rely on Transmission Control Protocol (TCP) or similar protocols, which emphasize optimizing bandwidth, the 'congestion avoidance' algorithms in the access networks will adjust to the link which is the speed. Buffers and queues on that link will be stressed to the limit, which will optimise bandwidth but increase the latency.

Typically, all network traffic merges into a single DOCSIS service flow. This traffic includes both streams that build queues—like video streaming apps—and streams that do not build queues—like multiplayer gaming apps. The challenge that this single-flow architecture presents is a lack of distinction between the two types of traffic. Both a gaming application and a video streaming application are treated the same on the network, but their needs are very different: A queueing delay might not matter for the purpose of watching a YouTube video, which can buffer and play asynchronously, but for competing in a multiplayer game, having data packets held in a queue is a meaningful disadvantage. The indiscriminate treatment of traffic on today's DOCSIS networks adds latency and jitter precisely where it's unwanted.

Low Latency DOCSIS (LLD) resolves the Queueing latency by using a dual queuing approach. Applications which are not queue building (such as online gaming applications) will use a different queue than the traditional queue building applications (such as file downloads). Non-queue building traffic will use small buffers—minimizing the latency—, queue building traffic will use larger buffers—maximizing the throughput. LLD therefore allows operators to group up- and downstream service flows to enable low-latency services.

Specifically, the LLD architecture offers several new key features, including ASF service flow encapsulation, which manages the traffic shaping of both service flows by enforcing an Aggregate Maximum Sustained Rate (AMSR), in which the AMSR is the combined total of the low-latency and classic service flow bit rates, Proactive Grant Service scheduling, which enables a faster request grant cycle by eliminating the need for a bandwidth request, as well as other innovations such as Active Queue Management algorithms which drop selective packets to maintain a target latency.

One other feature inherently necessary for LLD is Service flow traffic classification i.e., classifying packets as belonging either to the normal service flow of the low-latency service flow. Though packet classification plays a crucial role in implementing LLD, the DOCSIS standard is silent on how traffic is identified and put on the low latency service flow. As noted earlier, obvious implementations may involve specific applications such as gaming software or consoles, gaming servers etc. mark packets as belonging to a LLD service flow, or alternately customer premises gateways analyze packets to mark selected traffic as low-latency traffic, such implementations are burdensome.

The present disclosure describes novel devices, systems, and methods that reliably identify packets in a service flow as being low latency packets, and in a manner that does not rely on specific hardware at either a client device or a server (gaming, financial, etc.) communicating with that client device. Specifically, the present disclosure describes architectures that employ a first, preferably cloud-hosted low latency DOCSIS (LLD) agent that identifies characteristics or "fingerprints" of low-latency traffic, and communicates those characteristics to a second, network-hosted low latency DOCSIS agent that identifies individual packets that match the "fingerprints" specified by the first LLD agent, and processes those packets to add appropriate data to the packets by which network elements (routers, queues, etc.) can identify and direct the packets to a respectively appropriate one of a low-latency flow or a standard, non-low-latency flow.

As shown in FIGS. 3A-3D, the disclosed device, systems, and methods may be used in an in-line architecture, where the second LLD DOCSIS agent is inserted in-line with the service flows, or alternately may be used in a hairpin-style architecture where a router in the network diverts low-latency traffic to the second LLD agent. Specifically, an application server 210, which may be for example, a gaming server, financial server, video conferencing server, etc. may be in communication with one or more client devices 212, which each communicate with the server 210 using an in-home gateway 214 such as a cable modem and optionally a wireless router 216. Data packets communicated between the client device 212 and the server 210 are delivered via a wide-area network 218 such as the Internet, an intervening router network 220 and an access network (such as the network 100 shown in FIG. 1 or the network 150 shown in FIG. 2).

In each of FIGS. 3A-3D, the first LLD agent 226 (whose operation will be described later) may be hosted by a service provider in a public cloud 224, or in alternative embodiments may be hosted in-house by a service provider. In either circumstance, the first LLD agent 226 may communicate with the client device 212, the server 210, or the second LLD agent via the Internet 218, router network 220, and access network 222. In some embodiments, particularly in the hairpin implementation shown in FIGS. 3B and 3D, the first LLD agent 226 and the second LLD agent 228 may be in direct communication without reliance on the Internet 218, etc.

Figure 3A:
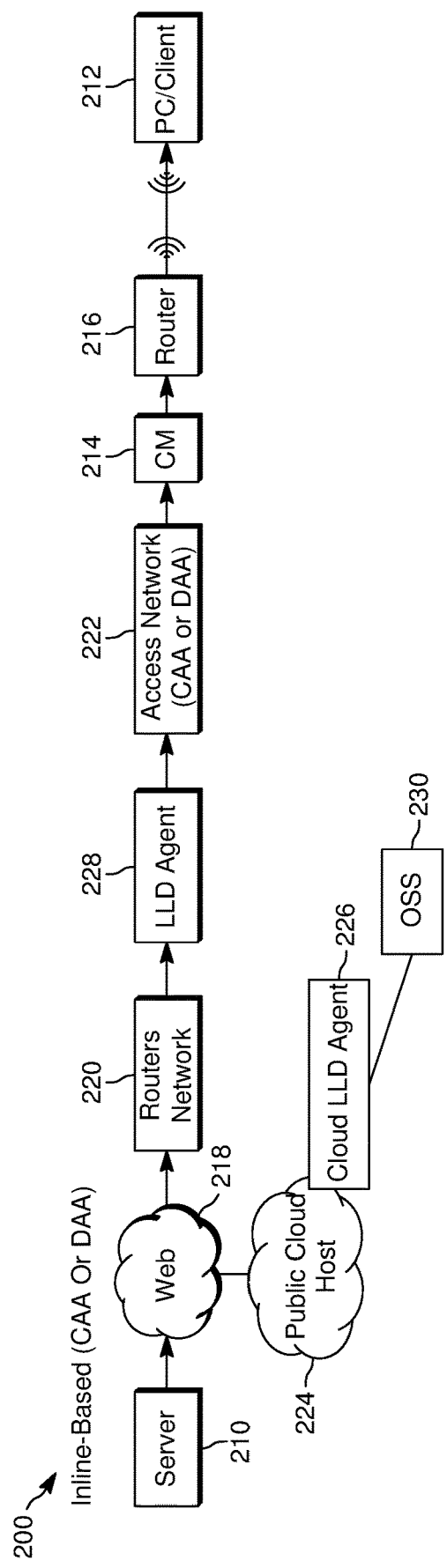
FIG. 3A shows an exemplary low-latency architecture in accordance with the present disclosure, with a cloud-based control plane LLD agent and an in-line data plane LLD agent, with an exemplary downstream service flow.

Referring specifically to FIGS. 3A, in an in-line architecture 200, the second LLD agent 228 (whose operation will be described in more detail later in this specification) is located in-line with the service flows, positioned between the router network 220 and the access network 222. In this configuration, the second LLD agent examines all packets flowing between the access network 222 and the router network 220, using the "fingerprints" provided by the first LLD agent 226 to identify which to further process so as to enable the access network 222 to correctly route such packets in a low-latency service flow as defined by the DOCSIS standard. This in-line arrangement thus necessitates a relatively large amount of processing power on the part of the second LLD agent 228.

Figure 3B:
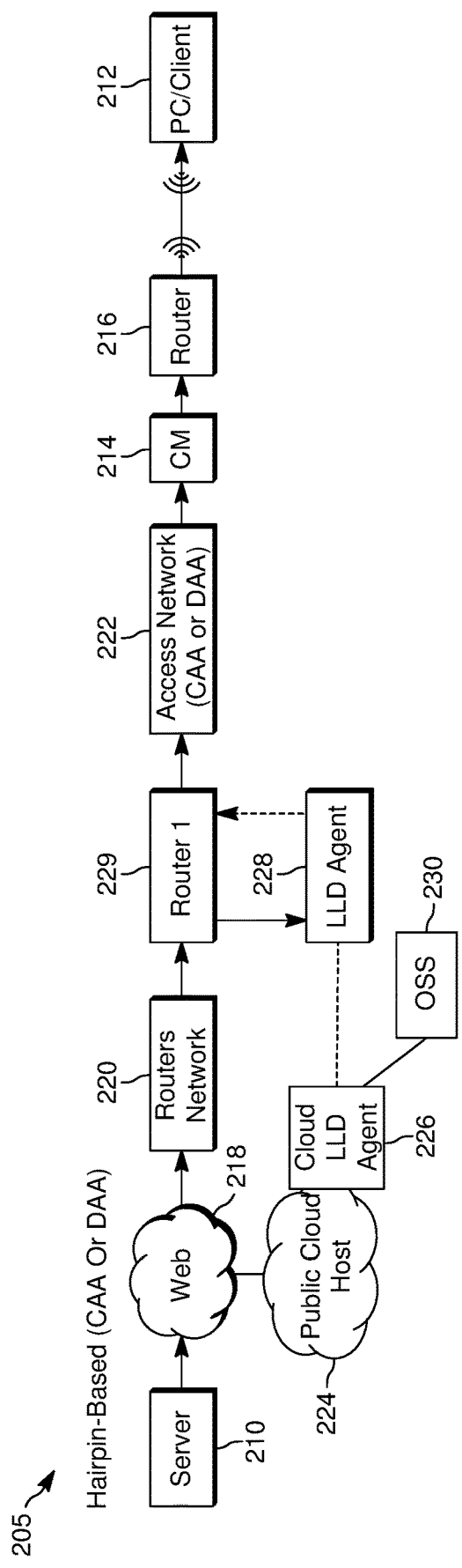
FIG. 3B shows an exemplary low-latency architecture in accordance with the present disclosure, with a cloud-based control plane LLD agent and hairpin-style data plane LLD agent, with an exemplary downstream service flow.

Referring to FIG. 3B, an alternate hairpin-type architecture 205 positions the second LLD agent 228 outside of the direct flow between the client device 212 and the server 210. In this configuration, the second LLD agent 228 uses the "fingerprints" provided by the first LLD agent 226 to set the policies of a router 229 of the router network 220 (indicated by the dashed line in FIGS. 3B and 3D), by which the router 229 can identify packets that should be marked for a low-latency service flow, and thereby forward such traffic to the LLD agent, which in turn processes only those packets to mark them in a manner that enables the access network 222 to correctly route such packets in a low-latency service flow as defined by the DOCSIS standard. The second LLD agent 228 then returns the marked packets to the router 229 for further transit along the network 205. In this hairpin-style architecture, the second LLD agent 228 needs a relatively low amount of processing power because it only needs to examine and process those packets that the router 229 forwards to it. Those of ordinary skill in the art sill recognize that the hairpin-style architecture may instead divert packets to and from a CMTS, RPD, or other device in the access network 220 rather than router 229.

FIGS. 3A and 3B each show the manner in which downstream traffic flows through the network for their respective architectures, while FIGS. 3C and 3D each show the manner in which upstream traffic flows through the network for their respective architectures.

The role of the first LLD agent 226 is preferably to identify characteristics or "fingerprints" of low-latency traffic. This may be accomplished in any one of a number of desired manners. For example, the LLD agent 226 may store a current list of games (or other applications) along with IP addresses, ports, etc. of client devices and servers. Thus, as explained later, the LLD agent 226 may receive information from a client device or a server indicating the initiation of a particular game or application and identify the source and destination IP addresses/ports. Alternatively, the first LLD agent 226 may be provisioned with machine learning or artificial intelligence algorithms that enable it to determine for itself what traffic is low latency traffic, and also identify the source/destination IP and port addresses of traffic in such flows.

Regardless of the particular manner in which the first LLD agent 226 identifies a low-latency flow, the first LLD agent 226 preferably uses the dynamic IP address and port numbers of the identified flows as "fingerprints," and provides those fingerprints to the second LLD agent 228. The second LLD agent 228, in the in-line architecture 200 uses those fingerprints to identify low latency traffic and process that traffic in a manner such that the access network 228 can recognize it as such and direct the low-latency traffic to the appropriate queues, etc. For the access network 222, the second LLD agent 228 may preferably communicate with the CCAP/RPD/RMD and/or CM to add classifiers to correspond to the selected games selected by the user.

Specifically, in the downstream direction, the second LLD agent 228 may preferably mark each packet identified as belonging to a low latency flow using a Type of Service (ToS) field. Specifically, Quality of Service (QOS) protocols for communications networks implement a Differentiated Service (DiffServ) solution that stores a value in the IP header of a data packet to indicate the priority a network should allocate to the packet relative to other packets. The IP header 18 includes a Type of Service (ToS) field 20. The ToS field 20 is an 8-bit identifier that was originally intended to store a six-bit value where the first three bits specified a precedence or importance value, the next three bits each specified a normal or improved handling for delay, throughput, and reliability, respectively, and the last two bits were reserved. In practice, however, the first three bits assigned for precedence were never used. Later, the DiffServ architecture specified the use of the ToS field to store a 6-bit code that indicates the precedence for a packet. The remaining two bits of the 8-bits are used to signal congestion control, defined by RFC3168. These bits may be modified by middle-boxes (or intermediary routers) and are used to signal congestion that may occur across the end-to-end path. The following table shows common code values and their meanings.

| DSCP value | Description (RFC 4594 [21]) | WebRTC [4] Flow Type/Priority |
| --- | --- | --- |
| CS1* | Low-priority data | Any/Very Low |
| AF42* | Multimedia conferencing | 1/Medium or High |
| EF* | Telephony | 1/Medium or High |
| CS0 | Standard | Any/Low |
| AF11, AF12, AF13 | High-throughput data | 4/Medium (AF11 only) |
| AF21 | Low-latency data | 4/High |
| AF31 | Multimedia streaming | 3/High |
| AF41 | Multimedia conferencing | 2/High |
| CS4 | Real-time interactive | not defined |
| CS5 | Signaling | not defined |
| CS7 | Reserved for future use | not defined |
| 1, 2, 4, 6, 41 | Undefined values | not defined |

In some preferred embodiments, the downstream classifier may be a single DSCP bit that identifies a packet as either belonging to a low latency flow or not belonging to a low latency flow. In other embodiments, more bit values may be used, particularly in systems that include varying levels of low latency. For example, some MSOs may wish to offer several tiers of low latency service, and the 8-bit ToS field may be used to classify each of these levels of service. In some embodiments, downstream traffic may also be tagged by the second LLD agent 228 for WiFi processing.

For upstream packets, these packets run from the client device 212/cable modem 214 through the access network 22. They can be identified by the second LLD agent 228 for upstream backbone processing based on Dynamic IP addresses, ports, etc. and marked as previously described. In some embodiments, upstream low-latency traffic may also be processed for anti-bleaching (i.t. to prevent ToS information from being overwritten or otherwise lost in the router network 220 or the Internet 218).

In the hairpin-style architectures of FIGS. 3B and 3D, the second LLD agent 228 preferably sets the policies of the router 229 to divert low latency traffic using Access Control Lists (ACLs) based on the "fingerprints" provided by the first LLD agent 226. These ACL lists (routing entries) may be injected into the router 229 using a control channel or using dynamic routing protocols. ACLs (routes) may be injected only when needed i.e., when games are active only, and in some embodiments may be one entry for multiple games. The configuration is therefore dynamic (routes and ACLs are added and deleted, but those entries are preferably static when entered, until deleted—meaning that they are not changed in real time.

Preferably the dataplane (tagging of traffic by the first LLD agent 228 and subsequent treatment by the access network 222) is local to each MSO network to avoid introducing additional latency. However, in some embodiments, the control plane may be shared across service groups, CCAPS etc.

Figure 4A:
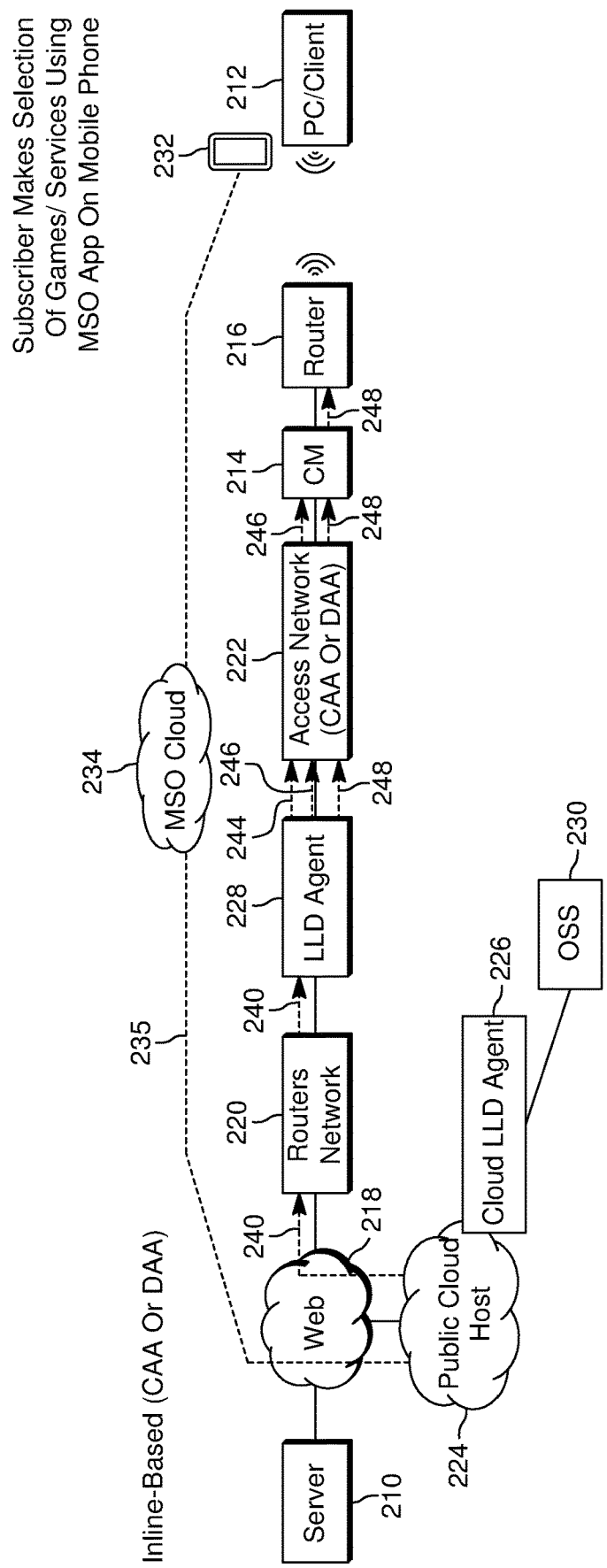
FIGS. 4A and 4B show a first embodiment for control packet flow for in-line and hairpin implementations, respectively, of the disclosed systems and methods.
Figure 4B:
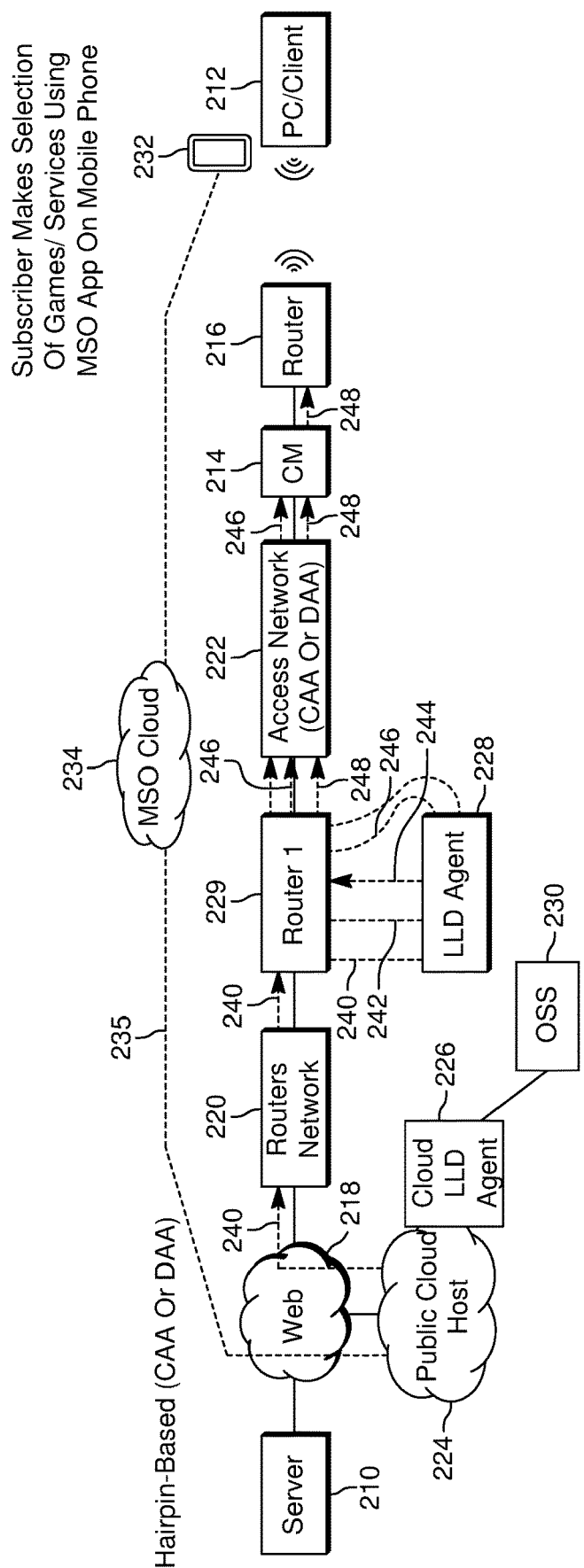

FIGS. 4A and 4B show an exemplary embodiment of the control flow of the systems of FIGS. 3A-3D. In this embodiment, the subscriber uses an MSO app or other software to makes a selection via client device 232 (in this case a cell phone), through an MSO cloud and the Internet 218 to the first LLD agent 226, through communication path 235, to select a game or other service that requires low latency treatment. The first LLD agent 226 uses its internal database of games, applications etc. to identify the "fingerprints" of the ensuing low latency traffic packets and forwards those fingerprints to the second LLD agent 226 via control path 240.

The second LLD agent 228, in turn, in the in-line architecture of FIG. 4A, uses those fingerprints to identify low latency packets traversing the network, or in the hairpin architecture of FIG. 4B, sets the policies of router 229 to allow the router 229 to identify and route traffic to the second LLD agent 228 using control path 242. The second LLD agent 228 also sends control messages to the access network 222, the cable modem 214, and the router 216 via control paths 244, 246, and 248, respectively.

Figure 5A:
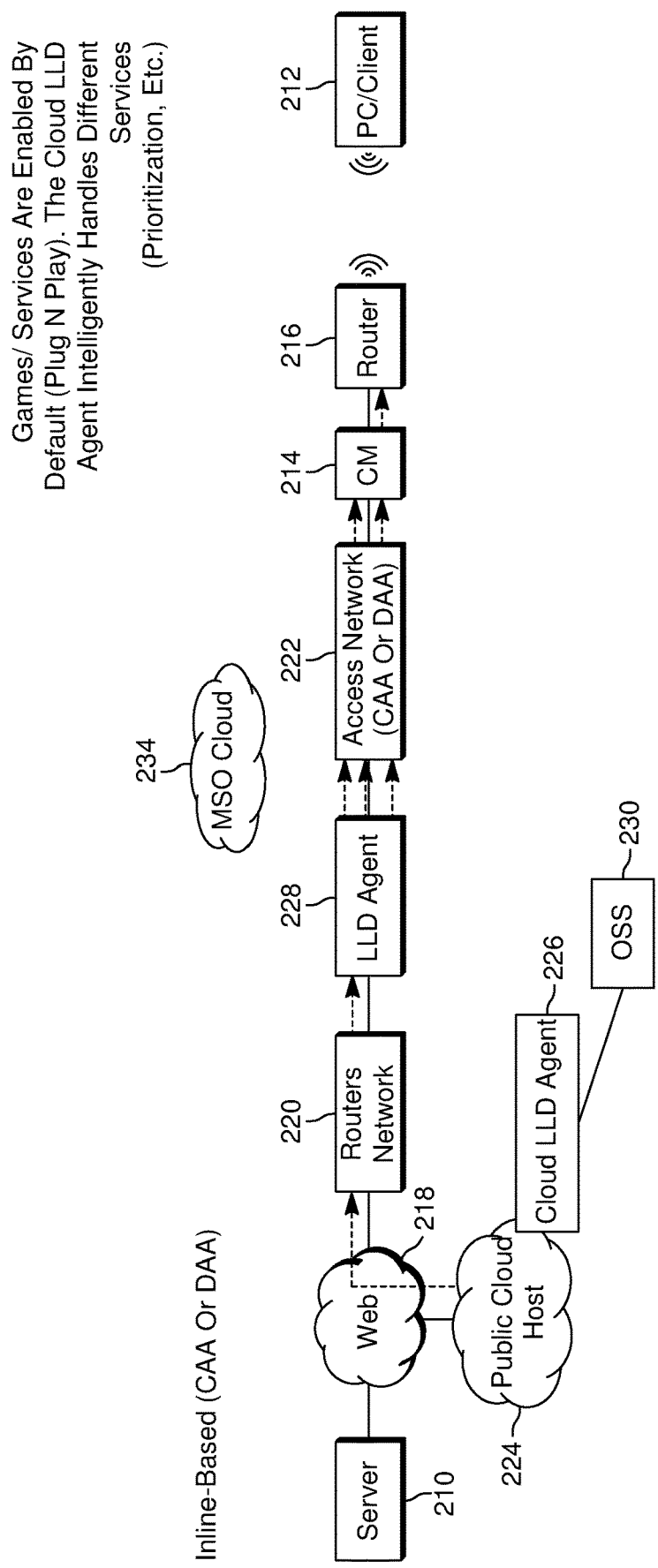
FIGS. 5A and 5B show a second embodiment for control packet flow for in-line and hairpin implementations, respectively, of the disclosed systems and methods.
Figure 5B:
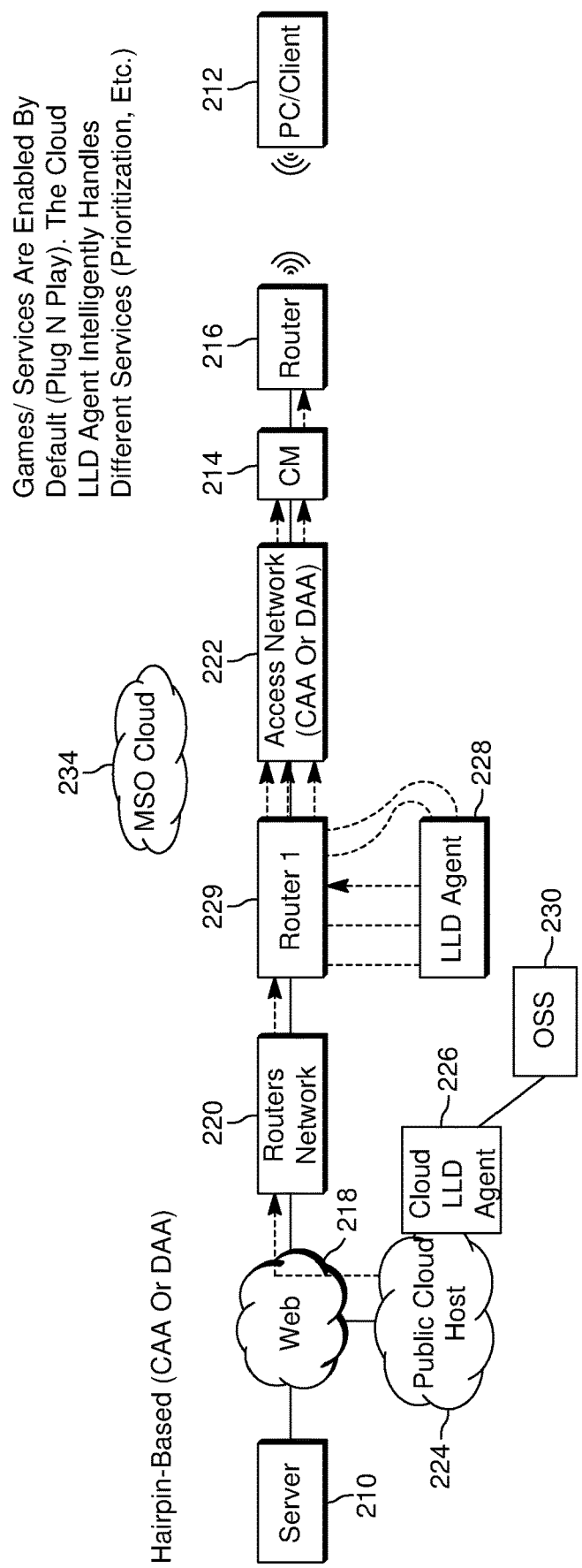

FIGS. 5A and 5B show an alternate embodiment where low latency games/services are enabled by default (plug and play). In this embodiment, the control path 234 through the MSO cloud is eliminated, and the first LLD agent 226 itself intelligently identifies and effectuates low latency services using, e.g., artificial intelligence/machine learning algorithms as previously described.

Figure 6A:
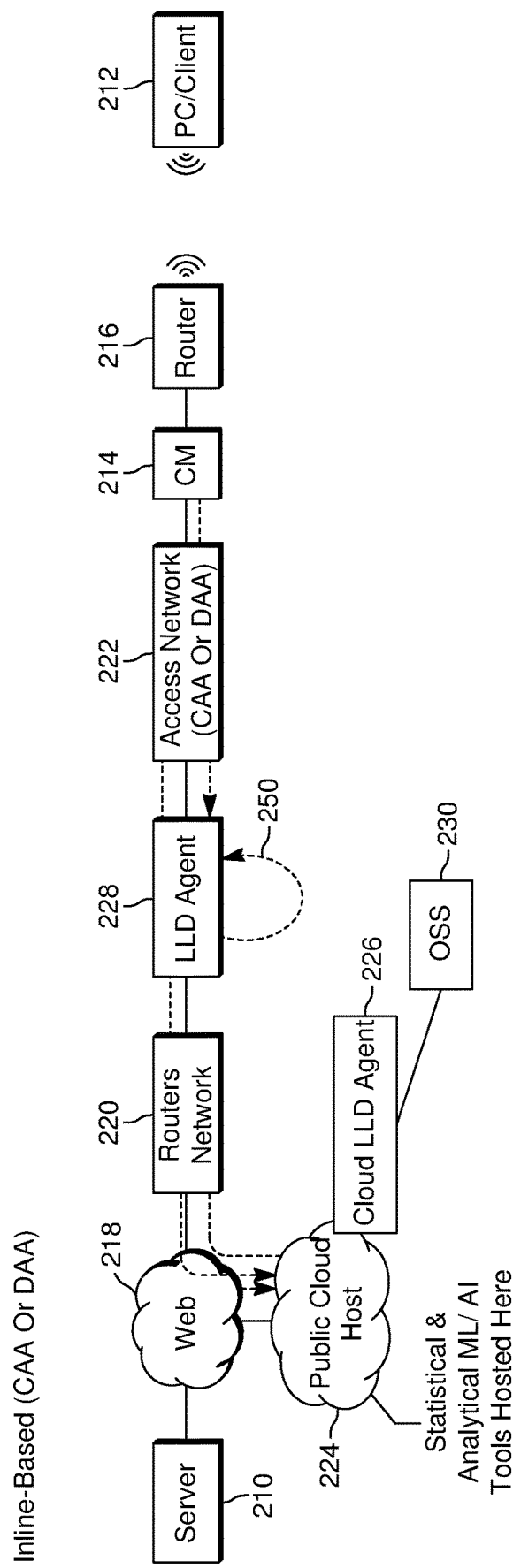
FIGS. 6A and 6B each show a respective embodiment for statistical and data aggregation and collection in the in-line and hairpin implementations of the disclosed systems and methods.
Figure 6B:
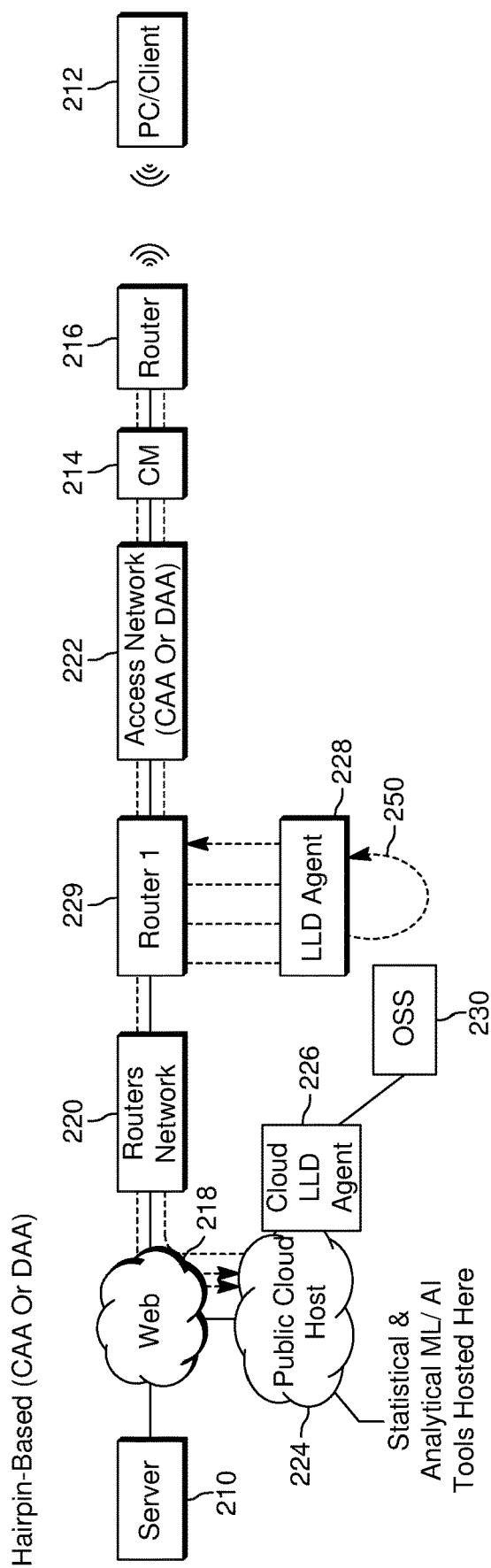

Referring to FIGS. 6A and 6B, the architectures shown in FIGS. 3A-5B are each preferably capable of collecting statistics that may, for example, be used to provide real time performance information on the latency achieved. In some embodiments, the first LLD agent 226 hosts dashboards that show summary statistics, configuration panels for routers and other network elements like CCAPs, RPDs, cable modems, etc., or even in other parts of the network. Measurement instrumentation can be placed in such network elements to allow the collection of such statistics. The second LLD agent 228 may also collect 250 its own statistics base don TCP handshake packets to calculate the round trip time of different loops. In some embodiments, these statistics, or the measurements used to calculate them, are forwarded to the first LLD agent 226. Aggregate information collected pr calculated by the first LLD agent 226 may be forwarded to the client device 212, and/or quality assurance systems or other network machine learning/AI engines hosted in Operating Support System(s) 230 that may provide network optimization functions. In this manner, the devices, systems, and methods described in this specification may be used to provide Quality of Service monitoring and troubleshooting.

Figure 7A:
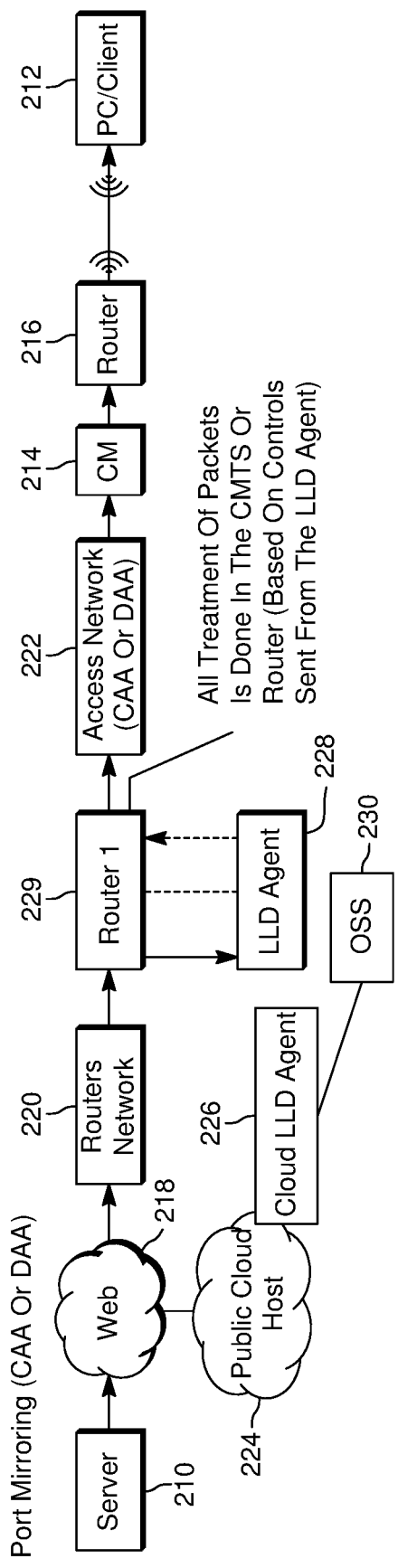
FIGS. 7A and 7B show an alternate port mirroring embodiment for the hairpin implementation of the disclosed systems and methods in downstream and upstream directions, respectively.
Figure 7B:
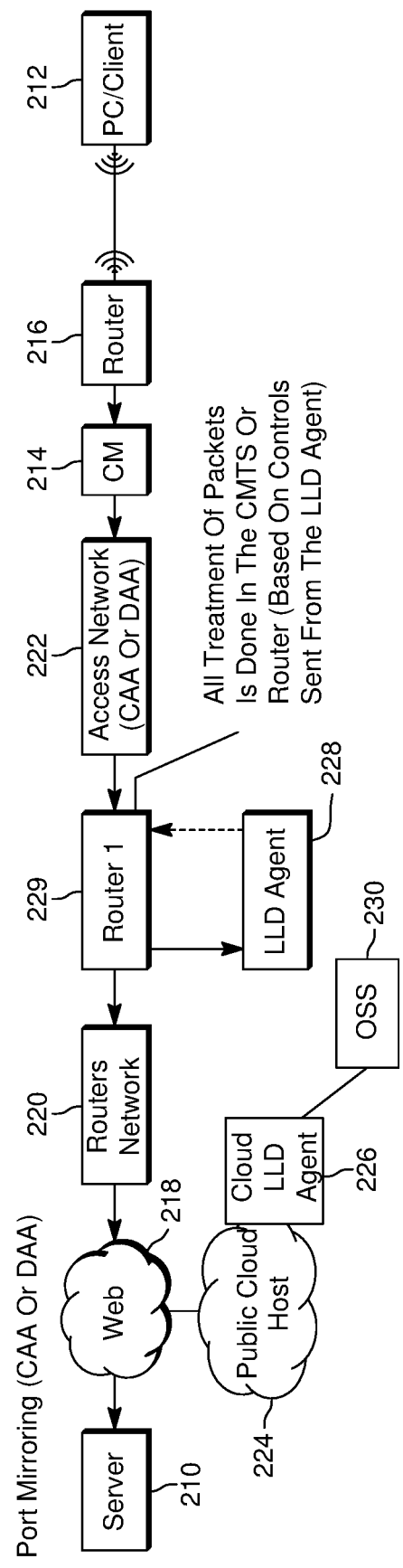

FIGS. 7A and 7B show an alternate embodiment to the hairpin architecture previously described, where, instead of routing identified LLD packets to the second LLD agent 228, the router 229 instead implements a port-mirroring solution. In this implementation, low latency packets identified by the router 229 using the policies set by the second LLD agent 228 are mirrored to a port to the second LLD agent. In this manner, all processing of the packets is performed in the router 229 (or CMTS) based on control messages sent from the second LLD agent 228.

As noted previously, particularly with respect to gamers, reducing network jitter—which is the variation in latency over time—may be more important than having the lowest possible latency. This is particularly true in the upstream direction out of their home, but is also important in the downstream direction, as well. Specifically, gamers have a strong desire to see a consistent latency/lag (i.e.—very low jitter) in their packet transmissions, because knowing what their stable latency is permits them to adjust their actions accordingly to compensate for the lag. Thus, gamers prefer to have a consistent latency/lag (i.e., minimum jitter), which helps them in achieving the desired outcome when they adjust their behaviors to compensate for the latency, and therefore they may easily prefer slightly higher average latencies in exchange for low jitter within their Service Provider's connection.

As packets travel from the gaming client to the gaming servers, and vice versa, they go through many hops inside the home network, access network, and backbone network. Variations in the latency in different network elements add together and can therefore cause cumulative jitter to become quite large. As a result, reducing jitter is an important Quality of Service (Qos) consideration for network operators. Any improvement in jitter in any network element will clearly help to reduce the cumulative jitter (which will give gamers improved experiences), and when most of the network elements have accomplished the goal of minimizing jitter, gamers will have improved gaming experiences.

Cable MSOs sit in a unique and important position within the overall network because they may be managing network elements in both the access network and in the home. Thus, MSOs may have the ability to control the latency and the jitter in their access network and potentially in the Wi-Fi network inside the subscriber's home. MSOs clearly have less influence over the latency and jitter within the backbone packet-switched and router network. However, as just mentioned, an MSO's ability to manage latency and jitter within the access and home network could greatly improve the overall gamer experience. This is especially true given that the access network connections are often "choke points" in the network. In the Downstream direction, the link bandwidth capacity may be narrowed from 100 Gbps Network-Side-Interface links (north of the CMTS) to 100 Mbps within the subscriber's Downstream Service Flow established by a Service Level Agreement. In the Upstream direction, the link bandwidth capacity may be narrowed from 1 Gbps inside the home Wi-Fi network to 5 Mbps within the subscriber's Upstream Service Flow established by a Service Level Agreement. These "choke points" can cause deep packet buffers to develop at the cable modem or at the CMTS. These deep buffers can grow as a result of packet bursts arriving at the "choke points," and variations in these buffer depths can lead to variations in latency (i.e.—jitter).

Given the jitter in backbone, access, and Wi-Fi networks, the total jitter can be very large, which negatively affects the gaming experience. Thus, a solution is desired to reduce the jitter and keep the variations in the end-to-end latency as small as possible. Additionally, gamers may prefer to choose the amount of latency that they want to experience to help them adjust their behavior in an optimal way.

In many cases, there may be a trade-off between average delay and jitter. Solutions that focus on reducing jitter may sometimes lead to larger average delays, and solutions that focus on reducing average delays may sometimes lead to more jitter. accordingly, preferred jitter control mechanisms as disclosed herein reduce jitter by any or all of: (1) ensuring that almost all packets within a particular gamer's packet stream experience identical delay; (2) ensuring that all subscribers (gamers) experience a similar jitter level; and (3) permitting subscribers (gamers) to have the option to individually select the ideal level of jitter for their gaming experience, with a trade-off being made between lowest latency levels and lowest jitter levels. This latter capability would ideally permit each subscriber to uniquely select any one of a range of settings between and including the lowest latency and the lowest jitter. This capability would also ideally permit each subscriber to uniquely select their desired average latency level.

Another latency-related problem addressed in the present disclosure relates to the issue of providing a consistent latency service across all subscribers, using a service that attempts to equalize the total latency for all subscribers connected to the network equipment, even if their respective packet streams experience different latencies in the backbone network to the gaming server. For example, if the gaming server is in Los Angeles, and two gamers are playing each other-one in Los Angeles and one in New York—it is clear that the gamer in Los Angeles (who is closer to the gaming server) may experience lower overall delays than the gamer in New York. In an attempt to make all of the gamers work under the same set of constraints, it might be desirable to create a "Total Latency Control Solution" that adds latency to the packet streams associated with the Los Angeles gamer to ensure that the total delays for both New York and Los Angeles gamers are similar. Alternatively, each specific subscriber could uniquely adjust their Total Latency to be the best fit for their particular gaming style. If a player prefers longer or shorter Total Latency levels, then they can select that particular setting. This individual setting capability could also be used to give certain gamers a handicap when they play gamers with different levels of skill.

As stated above, many users such as gamers find low jitter to be a very desirable attribute in their Service Provider network. Since jitter is a variation in latency between different packets sent over the network, it may be desirable to have the same latency for all gaming packets from a user's home (at the CM) and through the access network. As also stated above, jitter contributions can be found in many network elements. A service provider may not be able to address jitter in either the home or the backbone network, but using the systems and methods disclosed herein, can address the component of jitter resulting from the access network. In an MSO's HFC network, this is jitter that would result in the DOCSIS transport network. In the upstream direction, packets within a single packet stream from a single user may experience different delays for many reasons, which can include varying buffer depths found in the cable modem or the CMTS. Oftentimes, however, a key source of jitter in the upstream direction is the time it takes for the Request/Grant cycle to be executed for each packet. The Request/Grant cycle is the sequence of many events, including:

a) a Request message passed from the cable modem to the CMTS to request packet transmission;

b) MAPPER processing performed at the CMTS to determine when the packet can be transmitted;

c) grant messaging in a MAP message passed from the CMTS to the cable modem to communicate when the packet can be transmitted;
d) waiting time while the packet waits for its scheduled time to arrive; and
e) transmission of the actual data packet from the CM to the CMTS at the schedule time.

In preferred embodiments, a constant and consistent latency for packets in a particular gaming flow may be achieved by recognizing that the best or most useful latency may not necessarily need to be the shortest latency, and therefore some preferred embodiments increase the overall average latency for the user's packet streams to ensure lower jitter. For many users, this trade-off may be desirable. This modification would require a slightly different scheduling QoS algorithm for the DOCSIS path than that which is currently implemented in existing CMTSs. Specifically, typical existing CMTS scheduling QoS algorithms that schedule packets strive for "as low of a latency as possible" on each packet flow (where packet flows are typically associated with DOCSIS service flows). If there is an open slot for transmission of the packet, and if the packet has passed the Traffic Shaping requirements that are included to ensure that bursts are not occurring, then that packet would typically be transmitted. If there is congestion (meaning that open slots cannot be found), then the transmission of the packet takes a little longer. If there is no congestion (meaning that open slots for transmission are readily available), then the transmission of the packet takes a shorter amount of time. Thus, this legacy approach to packet scheduling clearly leads to variation in delay i.e., jitter, which is closely related to the level of congestion within the network or the level of congestion within the home's service flows.

Even with the addition of Low Latency DOCSIS features to cable modems and CMTSs in recent years, which create separate queues for Low-Latency packet flows that are separated from the queues for Classic packet flows, the packets assigned to the Low-Latency queues will still experience some levels of packet delay variation i.e., jitter, because the basic goal behind the scheduling QoS algorithm is still to strive for "as low of a latency as possible." Thus, if there are open slots for the transmission of a packet, the front packet within a Low-Latency queue will be immediately scheduled for transmission. But if there is congestion in the network and open slots are not readily available, then the front packet within that Low-Latency queue would be forced to wait until an open slot is available. As stated above, this legacy approach to packet scheduling clearly leads to variation in delay (jitter) which is closely related to the level of congestion within the network or the level of congestion within the home's service flows. This is true because each LLD service flow is competing with congestion from other LLD service flows that share the network.

The systems and methods disclosed in the present application differ from this traditional approach to packet scheduling by abandoning the scheduling QoS goal of striving for "as low of a latency as possible." Instead, a slight increase in average latency is accepted as a trade-off to ensure that all packets within a particular queue experience exactly the same latency, thereby redressing jitter, albeit a slightly higher average latency than was experienced without this change. This is preferably achieved by setting the total latency (delay) for the passage of packets through the access network to some small fixed delta above the expected "typical" latency, which may for example be measured as an average latency, an expected $99^{th}$-percentile latency or other expected X-percentile latency, or any other appropriate metric. For purposes of this specification, generalize this measure as an expected latency LE. Thus, the total latency (LT) that each packet will experience would ideally be set to:

$$LT=LE+DELTA \quad \text{(Eqn. 1)}$$

This equation is particularly useful when applied to packet streams that are associated with Low-Latency queues in the Low Latency DOCSIS (LLD) environment.

As an example of the implementation of this formula, assume that the $99^{th}$-percentile delay for the LLD queue is LE=10 ms, so one would expect to see delays of less than 10 ms most of the time. Packet delays for packets within that packet stream with delays of greater than 10 msec will only occur 1% of the time. Then, a small, fixed delta value is selected to add to that $99^{th}$-percentile delay. Assuming for instance, that the selected delta value is 5 ms. Then, preferred embodiments may strive to ensure that almost all packets from a user's packet stream passing through the access network should experience a delay of exactly LE+DELTA=10 ms+5 ms=15 ms.

In some embodiments, this may be accomplished by inserting programmable and variable delay elements within the path of the user's packet stream, which ensures that each packet is buffered for an appropriate (and probably different) amount of time so that its total latency ends up being exactly LE+DELTA=10 ms+5 ms=15 ms. As already noted, since upstream packets may experience different delays from when they first departed the cable modem, different additional delays will need to be added to ensure that the total latency (LT) is 15 ms. Conversely, in the downstream direction, packets may also incur different delays due to different buffering periods, so again different additional delays may be added to ensure that the total latency (LT) is 15 ms. Packets that already have experienced long delays will require less additional delay, and packets that already experienced short delays will require more additional delay. For instance, if a packet made it through the LLD queue in 2 ms, then 13 ms of additional delay would be added. If a packet made it through the LLD queue in 10 ms, then 5 ms of additional delay would be added.

In the upstream direction, this is preferably achieved by registering and storing the time when a BW Request message for an upstream packet transmission arrived at the CMTS from the CM. This moment in time essentially marks the start time for the packet's upstream path. The shipping time—i.e., the moment in time when the packet is released from a queue on the CMTS and sent on its way north into the Internet—should therefore be set to be a time that (assuming the foregoing example) is 15 ms after the start time. In other words:

$$SHIPPING\_TIME=START\_TIME+LE+DELTA \quad \text{(Eqn. 2)}$$

To ensure that the packet is egressed exactly at the shipping time, the packet can be placed into a waiting queue, and scheduled for extraction from the queue at the shipping time. This can be accomplished in several ways, including setting a timer to extract it from the queue at the appropriate shipping time, or having it move to the front of the queue with its shipping time available to be read and having the system query the queue periodically and compare the shipping time for the packet at the front of the queue with the current time (stored in a system clock that is continually updated). If the shipping time is earlier than the current time, then the packet should be extracted from the queue and sent on its way.

Figure 8A:
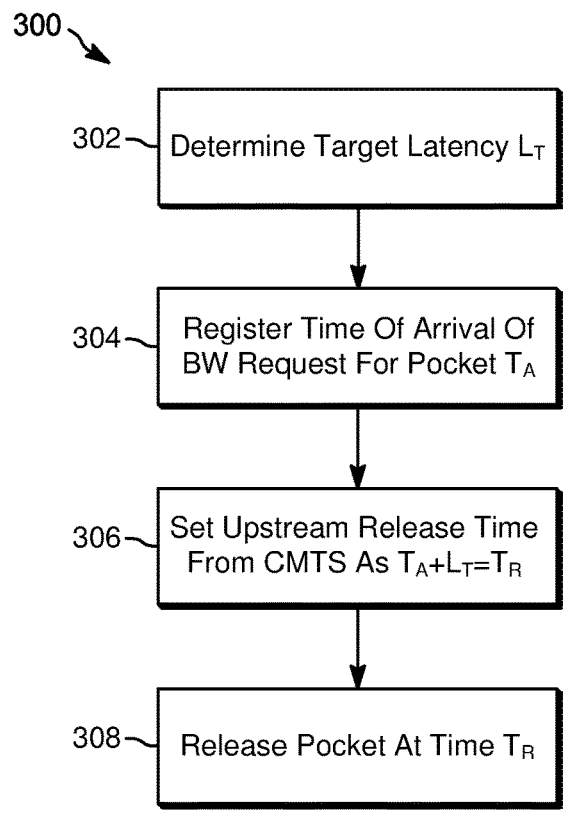
FIG. 8A shows an exemplary method of tuning latency to a desired value in an upstream direction from a cable modem to a CMTS.

FIG. 8A shows an exemplary method 300 that implements the foregoing method in the upstream direction. Specifically, at step 302 a target latency $L_t$ is determined, which as noted earlier may preferably be set to LE+DELTA. At step 304 the time of arrival of a bandwidth request for a packet is registered. At step 306 an upstream release time from the CMTS for the packet is set as $T_A+L_T=T_R$. At step 308 the packet is released in the upstream direction from the CMTS as the scheduled time $T_R$.

In the downstream direction, the time that the downstream packet arrived at the CMTS from the Internet would first be stored. That moment in time marks the start time for the packet's downstream path. The shipping time (i.e., the moment in time when the packet is released from a queue on the CMTS and sent it on its way south to the cable modem) should preferably be set to be a time that is 15 ms after the start time (assuming the foregoing example implementation). In other words:

$$SHIPPING\_TIME=START\_TIME+LE+DELTA \quad (Eqn. 2)$$

Notably, this is the same equation used for the upstream direction, but the start time is now marked by the time when the downstream packet arrived at the CMTS. To ensure that the packet is egressed exactly at the shipping time, the packet may be placed into a waiting queue and then scheduled for extraction from the queue at the shipping time. This can be accomplished in several ways, including setting a timer to extract it from the queue at the appropriate shipping time, or having it be in the front of the queue with its shipping time available to be read and having the system query the queue periodically and compare the shipping time for the packet at the front of the queue with the current time (stored in a system clock that is continually updated). If the shipping time is earlier than the current time, then the packet should be extracted from the queue and sent on its way. As a result, all packets from this particular flow would almost always see 15 msec of delay.

Figure 8B:
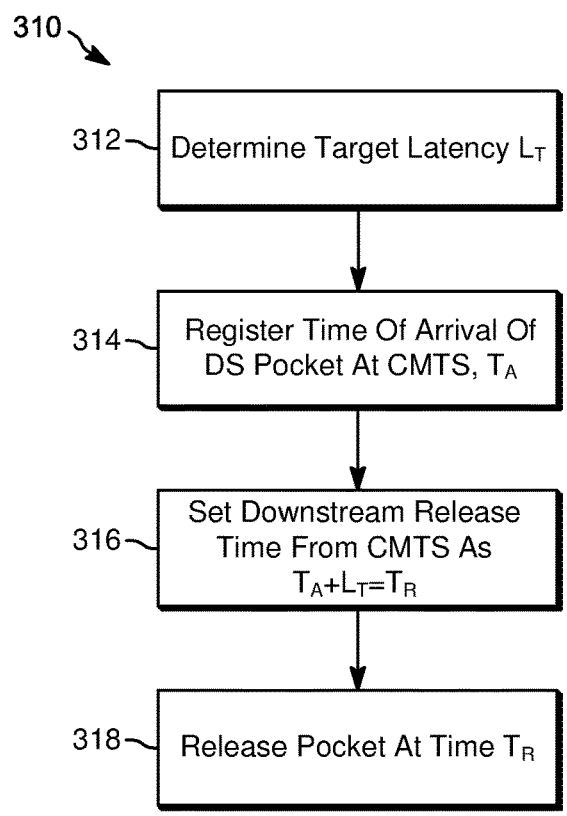
FIG. 8B shows an exemplary method of tuning latency to a desired value in a downstream direction from a CMTS to a cable modem.

FIG. 8B shows an exemplary method 310 that implements the foregoing method in the downstream direction. Specifically, at step 322 a target latency Lt is determined, which as noted earlier may preferably be set to LE+DELTA. At step 314 the time of arrival of the arrival of a downstream packet at the CMTS is registered. At step 316 a downstream release time from the CMTS for the packet is set as TA+Lt=TR. At step 318 the packet is released in the downstream direction from the CMTS as the scheduled time TR.

The foregoing disclosure describes systems and methods that reduce the magnitude of jitter by ensuring that almost all packets within a particular user's packet stream experience identical delay, and in particular a delay given by LT=LE+DELTA. Other embodiments, however, may address the issue of ensuring that users (e.g., gamers) experience a similar jitter level? That can be easily accomplished by having the same LT value configured for all of the subscriber service flows that desire the use of this Jitter Control Solution.

Moreover, further embodiments may additionally (or alternatively) permit users to exercise an option to individually select their preferred level of latency/jitter for their experience, with a trade-off being made between lower latency levels and lower jitter levels. It should be clear that reducing the DELTA value in the formula LT=LE+DELTA will reduce the average latency experienced by packets in the user's packet stream. However, making DELTA smaller implies that there will be more packets that have actual delays that exceed the LT=LE+DELTA value, and all those packets will have increased jitter because their total actual delay must by definition be greater than the desired LT=LE+DELTA latency value. Making LE smaller, by for example defining it to be the 90-percentile latency or the average latency, leads to similar increases in jitter. As a result, one can permit subscribers (gamers) to make trade-offs between their average latency and their jitter. Experimentation may be required to characterize the nature of the trade-off. Nonetheless, a service provider could enable latency/jitter management a customer-selectable feature during service subscription or could even make it be a customer programmable feature (where the customer could surf to a sign-on server and change the nature of their average latency/jitter trade-off dynamically for each of their gaming sessions). This could, for example, be used by multiple gaming players to ensure that all of them have set themselves to the same level of play with the same average latency/jitter levels defined.

Since MSOs cannot control the backbone network latency and jitter, in preferred embodiments, latency in the access and/or Wi-Fi networks may be selectively controlled by a user. The total end-to-end desired latency can be tunable by the user, and the MSO can vary the latency in the access and Wi-Fi networks to compensate for the changes due to measured latency in the backbone network. For example, if the subscriber configures the total desired average latency (LD) to be a certain value within Equation (1), the MSO can adjust the average latency in the access network (LA) and the average latency in the Wi-Fi network (LW) to compensate for the average latency introduced by the backbone network (LB) such that LD is as fixed as possible to the desired average value:

$$LD=LB+LA+LW. \quad (Eqn, 3)$$

For example, if LD is 35 ms, and LB is 20 ms, then LA+LW should be 15 ms. If LB decreases to 15 ms, then LA+LW should be 20 ms. Similarly, if LB increases to 25 msec, then LA+LW should be 10 ms, and so on.

The latency in the access network can be controlled to achieve the above embodiment. For example, the time that an upstream bandwidth request message arrives at the CMTS could be stored, and the packet buffered for a certain amount of time, then released as described earlier. Thus, the shipping time of packet for which a bandwidth request message mas made maybe determined, and the packet placed it into a delay queue and sent it on its way when that shipping time arrives. Coordination between Wi-Fi and access networks is preferably used to control the sum of latency of those networks. Proactive Grant Service and Bandwidth Request messages can be used to achieve such coordination.

Alternatively, the same solution described above can be implemented without using any information on the Wi-Fi network latency (LW). If in-home WiFi latency information is not available, that value can be "zeroed out" and the equations can still be utilized, whereby:

$$LD=LB+LA \quad (Eqn, 4)$$

This simplified version is still useful; it makes the implicit assumption that it is up to each gamer to try to minimize their in-home latency (LW) as much as possible to drive their LW value as close to the assumed value zero as possible. For example, gamers might place their gaming unit next to their cable modem if they want to take that effort to an extreme. But in the end, the MSO (or service provider) would be ensuring that the average latency of the path from the cable modem to the gaming server is the same for each gamer (regardless of the in-home Wi-Fi network latency experienced by each gamer). This simplified version of the solution permits the MSO (or service provider) to focus on the areas that they manage, and lets the gamer focus on the area (Wi-Fi) that they manage. Whether employing Equation (3) or the simplified Equation (4), the MSO (or service provider) can therefore give some level of guarantee that the user will have a certain average end-to-end latency (LD) for their packets within this service offering.

It should be clear that ensuring that Equation (3) or Equation (4) are satisfied will require that the MSO be able to adjust either LB or LA or both. Adjustment of LA can be accomplished using the techniques described earlier with respect to the description accompanying FIGS. 8A and 8B.

Those of ordinary skill in the art will appreciate that, although the foregoing embodiments describing systems and methods for allowing tunable latency service to users were described with respect to a CMTS in a head end scheduling the delivery of such packets from the CMTS, other embodiments may use distributed access architectures in which remote devices such as Remote Physical Devices (RPDs), Remote MACPHY devices (RMDs), etc. may also be used to implement the foregoing disclosure.

Those of ordinary skill in the art will also appreciate that, although the foregoing embodiments were described in relation to a user having a cable modem in communication with a CMTS, the disclosed systems and methods may be used with other subscriber devices, such as a DSL modem, a set-top box, and Internet-enabled television, etc.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of relaying a plurality of data packets to and from a subscriber over an access network that imparts a variable latency of one packet relative to other packets, the method comprising controlling the latency of each packet so as to increase the average latency experienced by the plurality of packets and decrease the variance of the respective latencies experienced by each of the packets.

2. The method of claim 1 including the step of determining a target latency by adding a selected additional amount of latency to a measured average latency experienced by a plurality of second data packets.

3. The method of claim 2 including the step of buffering each of the plurality of data packets for a period of time to prevent each of the plurality of packets from experiencing an amount of latency less than the target latency.

4. The method of claim 3 including the step of setting a timer to extract a data packet from the buffer after the target latency is reached.

5. The method of claim 3 including the steps of: (i) appending a shipping time to a packet; (ii) periodically querying the packet while in the queue to compare the shipping time to a current time; and (iii) extracting the packet from the buffer once the current time is equal to or exceeds the shipping time.

6. The method of claim 2 including the step of registering a time of arrival of a bandwidth request message from a subscriber device for transmission of an upstream packet, and setting the target latency for the upstream packet in reference to the time of arrival.

7. The method of claim 2 including the step of registering a time of arrival of a downstream packet destined for a subscriber device, and setting the target latency in reference to the time of arrival.

8. The method of claim 1 where the magnitude of latency of packets transmitted to and from a user is tunable by the user.

9. The method of claim 8 including the step of determining a target latency by adding a selected additional amount of latency to a measured average latency experienced by a plurality of second data packets.

10. The method of claim 9 where the target latency is determined based upon an amount of latency in a home network of the user.

11. A method of providing data services over a network that imparts a variable latency to respective packets of data relative to each other, the method comprising relaying a first plurality of the data packets to and from a first subscriber over the access network, the first plurality of data packets having an average latency tunable by the first subscriber.

12. The method of claim 11 including relaying a second plurality of the data packets to and from a second subscriber over the access network, the second plurality of data packets having an average latency independently tunable by the second subscriber, where the first subscriber and the second subscriber are able to tune the average latency of the first plurality of data packets and the second plurality of data packets, respectively, independently of each other.

13. The method of claim 1 including the step of receiving a target total latency from the first user.

14. The method of claim 13 including the step of buffering each of the plurality of data packets for a period of time to prevent each of the plurality of packets from experiencing an amount of latency less than the target latency.

15. The method of claim 13 where the target latency is determined based upon an amount of latency in a home network of the user.

* * * * *